(12) United States Patent
Sugiura

(10) Patent No.: US 9,001,063 B2
(45) Date of Patent: Apr. 7, 2015

(54) ELECTRONIC APPARATUS, TOUCH INPUT CONTROL METHOD, AND STORAGE MEDIUM

(71) Applicant: Kabushiki Kaisha Toshiba, Tokyo (JP)

(72) Inventor: Chikashi Sugiura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 13/676,689

(22) Filed: Nov. 14, 2012

(65) Prior Publication Data

US 2013/0285941 A1 Oct. 31, 2013

(30) Foreign Application Priority Data

Apr. 27, 2012 (JP) ................................. 2012-102574

(51) Int. Cl.
*G06F 3/041* (2006.01)
*G06F 3/01* (2006.01)
*G06F 3/0488* (2013.01)

(52) U.S. Cl.
CPC .............. *G06F 3/017* (2013.01); *G06F 3/0416* (2013.01); *G06F 3/0418* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 4,947,156 A | 8/1990 | Sato et al. | |
| 8,266,529 B2 | 9/2012 | Ooi et al. | |
| 2006/0017709 A1 | 1/2006 | Okano | |
| 2007/0177804 A1 | 8/2007 | Elias et al. | |
| 2010/0095205 A1 | 4/2010 | Kinoshita | |
| 2012/0001861 A1* | 1/2012 | Townsend et al. | 345/173 |
| 2012/0223906 A1* | 9/2012 | Zhou | 345/173 |
| 2013/0147833 A1* | 6/2013 | Aubauer et al. | 345/619 |
| 2013/0215060 A1 | 8/2013 | Nakamura | |

FOREIGN PATENT DOCUMENTS

| | | |
|---|---|---|
| JP | 61/120231 | 7/1986 |
| JP | 06-035596 | 2/1994 |
| JP | 06-348391 A | 12/1994 |
| JP | 2004-185495 | 7/2004 |
| JP | 2006-039686 | 2/2006 |
| JP | 2007-233649 | 9/2007 |
| JP | 2008-084119 | 4/2008 |
| JP | 2009-525538 | 7/2009 |
| JP | 2009-276926 | 11/2009 |
| WO | WO 2012/049942 | 4/2012 |
| WO | WO 2012/053141 | 4/2012 |

OTHER PUBLICATIONS

Japanese Office Action and English translation for corresponding Japanese Application No. JP 2012-102574, mailed Mar. 12, 2013, in 4 pages.

* cited by examiner

*Primary Examiner* — Adam R Giesy
*Assistant Examiner* — Henok Heyi
(74) *Attorney, Agent, or Firm* — Knobbe, Martens, Olson & Bear, LLP

(57) ABSTRACT

According to one embodiment, an electronic apparatus includes a touchpanel display and a controller. The controller is configured to input, if a first region of a first contact on the touchpanel display comprising an area larger than a first area is detected and a second region of a second contact on the touchpanel display comprising an area smaller than the first area is detected, positional information of the second contact detected via the touchpanel display.

15 Claims, 7 Drawing Sheets

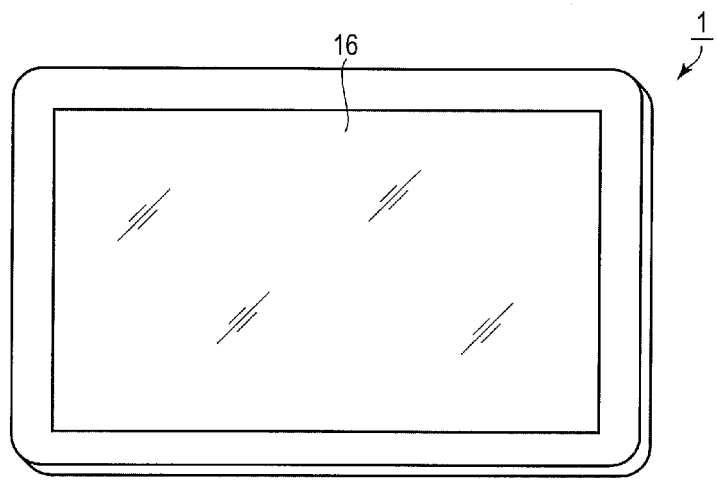
F I G. 1
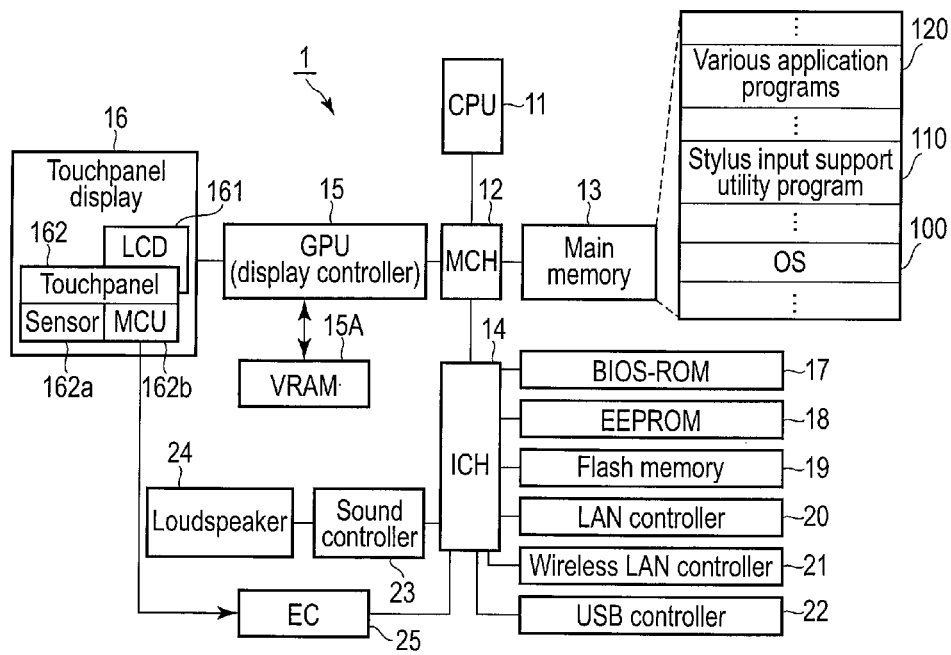
F I G. 2

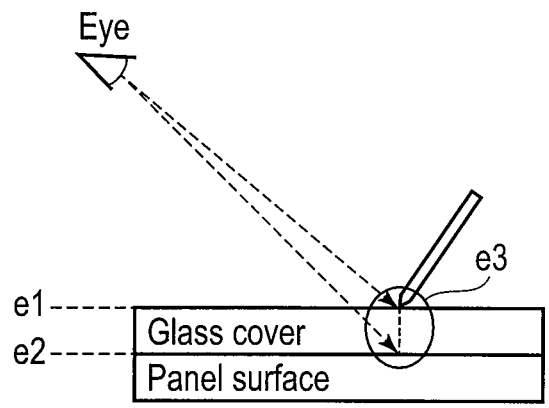
F I G. 8
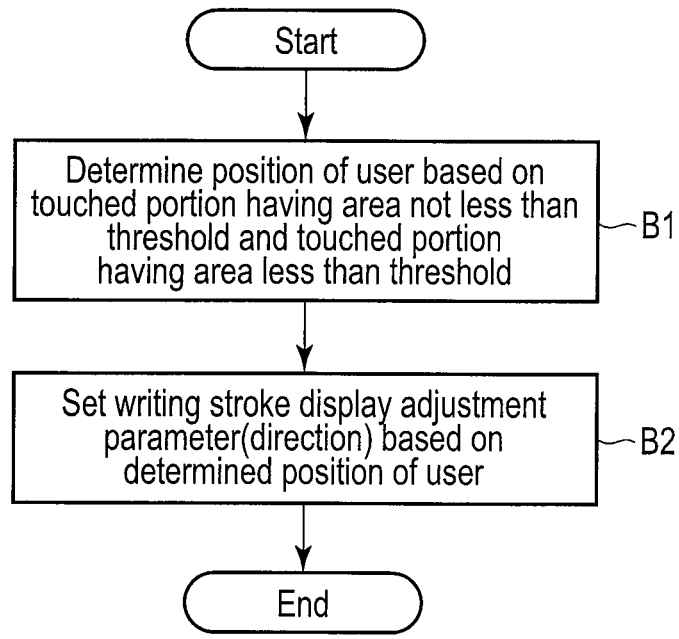
F I G. 9

US 9,001,063 B2

ELECTRONIC APPARATUS, TOUCH INPUT CONTROL METHOD, AND STORAGE MEDIUM

CROSS-REFERENCE TO RELATED APPLICATIONS

This application is based upon and claims the benefit of priority from Japanese Patent Application No. 2012-102574, filed Apr. 27, 2012, the entire contents of which are incorporated herein by reference.

FIELD

Embodiments described herein relate generally to a touch input control technique suitable for, for example, a personal computer (PC) or the like, which includes a touchpanel display.

BACKGROUND

In recent years, an electronic apparatus which is called a tablet terminal and includes a handwriting input (touch input) function has prevailed. The handwriting input function in the electronic apparatus of this type is normally implemented by a touchpanel display prepared by overlying a touchpanel on a display.

As for a handwriting input using this touchpanel or the like, various proposals such as a mechanism for preventing input errors and the like have been made so far.

Touch inputs on the touchpanel roughly include a touch input for an operation and that for writing. When the user writes, it is natural to place the side (little finger side) of the hand that holds a writing instrument on the writing surface. However, in a normal touch input, when the user places the side of the hand which holds a stylus on the touchpanel before he or she starts a stylus input on the touchpanel, this contact of the side of the hand on the touchpanel is unwantedly detected as a touch input. For this reason, a natural stylus input cannot be made while placing the side of the hand on the writing surface.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing the outer appearance of an electronic apparatus according to the first embodiment.

FIG. 2 is an exemplary block diagram showing the hardware arrangement of the electronic apparatus according to the first embodiment.

FIG. 8 is an exemplary view for explaining necessity of writing stroke display position adjustment executed in the electronic apparatus according to the first embodiment.

FIG. 9 is an exemplary flowchart showing the writing stroke display position adjustment sequence executed in the electronic apparatus according to the first embodiment.

DETAILED DESCRIPTION

Figure 3:
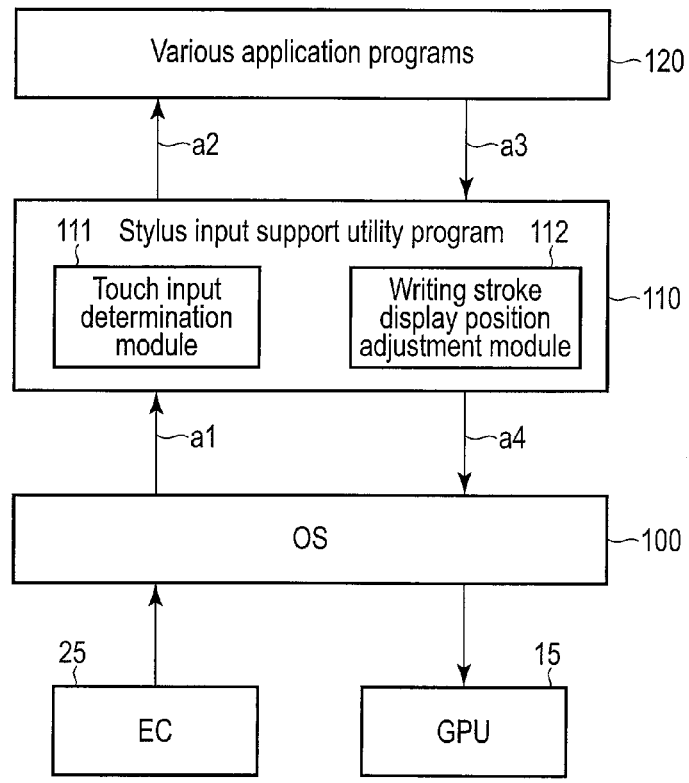
FIG. 3 is an exemplary block diagram showing the software configuration associated with a touch input of the electronic apparatus according to the first embodiment.

Various embodiments will be described hereinafter with reference to the accompanying drawings.

In general, according to one embodiment, an electronic apparatus includes a touchpanel display and a controller. The controller is configured to input, if a first region of a first contact on the touchpanel display comprising an area larger than a first area is detected and a second region of a second contact on the touchpanel display comprising an area smaller than the first area is detected, positional information of the second contact detected via the touchpanel display.

First Embodiment

The first embodiment will be described first.

FIG. 1 is an exemplary view showing the outer appearance of an electronic apparatus 1 of this embodiment. As shown in FIG. 1, this electronic apparatus 1 is implemented as, for example, a so-called tablet PC which includes a low-profile board-shaped housing, and also a touchpanel display 16 arranged at the central portion of the front surface of the housing. When the user makes a touch input such as a stylus input, finger input, or the like on the touchpanel display 16, writing data and an operation instruction are given to this electronic apparatus 1. Assume that the stylus input means a touch input for writing, and the finger input means a touch input for an operation. Note that a touch input for an operation ("finger input" in this embodiment) can also be made using a stylus.

FIG. 2 is an exemplary block diagram showing the hardware arrangement of this electronic apparatus 1.

As shown in FIG. 2, this electronic apparatus 1 includes a CPU 11, memory controller hub (MCH) 12, main memory 13, input/output controller hub (ICH) 14, display controller (GPU) 15, and video memory (VRAM) 15A. Also, this electronic apparatus 1 includes the touchpanel display 16, a BIOS-ROM 17, EEPROM 18, flash memory 19, and LAN controller 20. Furthermore, this electronic apparatus 1 includes a wireless LAN controller 21, USB controller 22, sound controller 23, loudspeaker 24, and embedded controller (EC) 25.

The CPU 11 is a processor, which controls the operation of this electronic apparatus 1, and executes various programs such as an operating system (OS) 100, stylus input support utility program 110, and various application programs 120, which are loaded from the flash memory 19 into the main memory 13. The stylus input support utility program 110 is software used to improve usability of a handwriting input on the touchpanel display 16. More specifically, the stylus input support utility program 110 allows the user to make a stylus input on the touchpanel display 16 while the user places the side of the hand which holds a stylus on the touchpanel display 16, and this point will be described later. The CPU 11 also executes a BIOS stored in the BIOS-ROM 17. The BIOS is a program required for hardware control.

The MCH 12 operates as a bridge which connects between the CPU 11 and ICH 14, and also as a memory controller which controls accesses to the main memory 13. Also, the MCH 12 includes a function of executing a communication with the GPU 15.

The GPU 15 is a display controller which executes an image display operation on an LCD 161 built in the touchpanel display 16 using the video memory 15A. The GPU 15 incorporates an accelerator which renders images to be displayed by various programs in place of the CPU 11.

The ICH 14 operates as a memory controller, which controls accesses to the BIOS ROM 17, EEPROM 18 and flash memory 19. Also, the ICH 14 includes a function of executing communications with the LAN controller 20, wireless LAN controller 21, USB controller 22, sound controller 23, and EC 25.

The EEPROM 18 is a storage medium used to store, for example, identification information and the like of this electronic apparatus 1. The LAN controller 20 is a wired communication device which executes wired communications conformant to, for example, the IEEE 802.3 standard. On the other hand, the wireless LAN controller 21 is a wireless communication device which executes wireless communications compliant with, for example, the IEEE802.11 standard. The USB controller 22 is a wired communication device which executes communications conformant to, for example, the USB 2.0 standard with externally connected USB devices.

The sound controller 23 is a sound source device and outputs audio data to be played back to the loudspeaker 24. The EC 25 is an embedded controller required for power management of this electronic apparatus 1. The EC 25 incorporates an input controller used to control a touch input on the touchpanel display 16.

The touchpanel display 16 also incorporates a touchpanel 162 in addition to the aforementioned LCD 161. The touchpanel 162 disposed to overlap the LCD 161 is a multi-touch compatible touchpanel, and includes a sensor 162a and micro controller unit (MCU) 162b. When a touch input is made on the touchpanel 162, that region is detected by the sensor 162a, and the MCU 162b outputs input information including timing information indicating an input timing on the touchpanel 162 and positional information indicating an input position on the touchpanel 162. The input information output by the MCU 162b is supplied to the EC 25. The EC 25 stores this input information in its own register, and generates an interrupt, thereby notifying the CPU 11. Then, the EC 25 controls the CPU 11 to read the input information stored in the register. In this way, occurrence of an event, that is, a touch input on the touchpanel 162 is transmitted to the OS 100, which notifies the stylus input support utility program 110 of occurrence of this event.

FIG. 3 is an exemplary block diagram showing the software configuration associated with a touch input of this electronic apparatus 1.

As shown in FIG. 3, the stylus input support utility program 110 lies between the OS 100 and various application programs 120. The stylus input support utility program 110 includes a touch input determination module 111 and writing stroke display position adjustment module 112.

As described above, when a touch input is made on the touchpanel 162, the stylus input support utility program 110 is notified of occurrence of this event via the OS 100 (a1 in FIG. 3). The touch input determination module 111 is a module which determines, for example, whether this touch input is generated when the side of the hand is placed on the touchpanel 162 for a stylus input, or is either a stylus input or finger input.

The stylus input support utility program 110 notifies, for example, an active application program of the various application programs 120 of a stylus input or finger input message based on the determination result of the touch input determination module 111. At the time of this notification, the stylus input support utility program 110 supplies positional information (indicating an input position on the touchpanel 162) included in input information to that application program (a2 in FIG. 3).

The application program, which is notified of the stylus input message, notifies the stylus input support utility program 110 of a display request of a writing stroke (required to feed back a writing position to the user) on the LCD 161. At the time of this notification, the stylus input support utility program 110 receives positional information indicating a position where that writing stroke is to be displayed on the LCD 161 from the application program (a3 in FIG. 3).

The writing stroke display position adjustment module 112 is a module required to relay the display position of this writing stroke to the OS 100 after it adjusts that display position (a4 in FIG. 3). The operation principle of this writing stroke display position adjustment module 112 will be described later. Note that a display operation of the writing stroke on the LCD 161 may be executed by the stylus input support utility program 110. In this case, the stylus input support utility program 110 may supply data indicating a writing stroke so far to the application program at, for example, a stylus input end timing.

Figure 4:
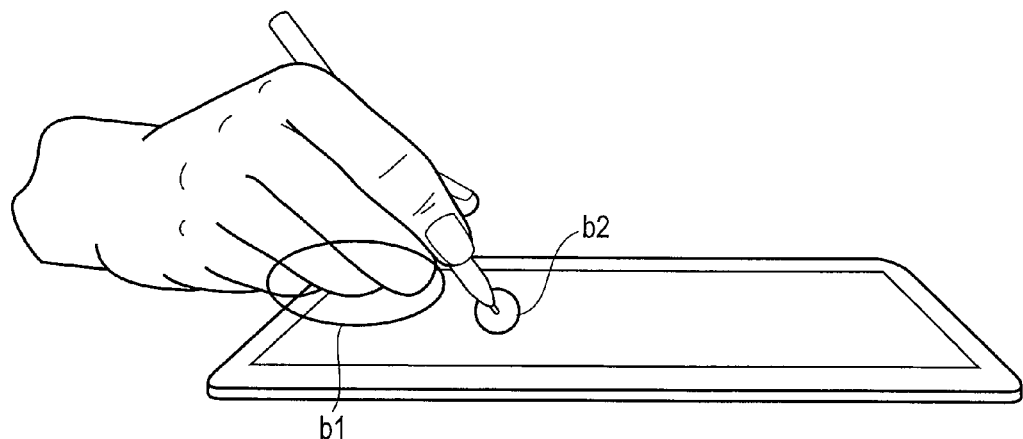
FIG. 4 is an exemplary view showing one mode of a stylus input on a touchpanel executed in the electronic apparatus according to the first embodiment.

FIG. 4 is an exemplary view showing one mode of a stylus input on the touchpanel 162 executed in this electronic apparatus 1.

Figure 5:
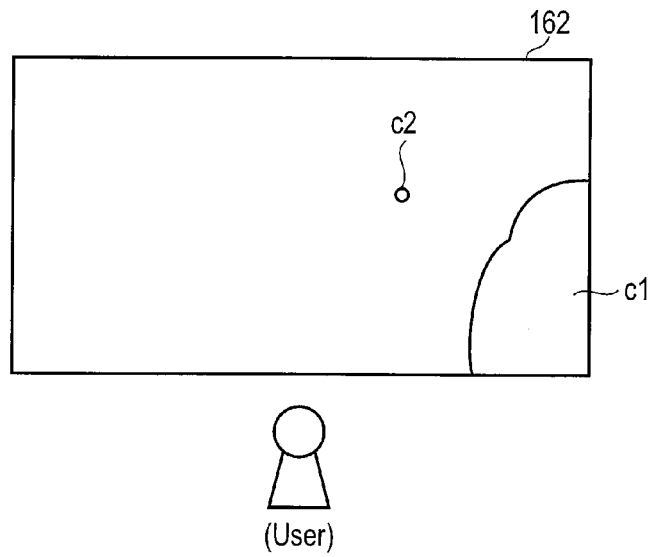
FIG. 5 is an exemplary view illustrating an example of the touch detection results at stylus input timings on the touchpanel in the electronic apparatus according to the first embodiment.

As shown in FIG. 4, when a stylus input is made on the touchpanel 162 of the touchpanel display 16, it is natural to place the side (little finger side) of the hand that holds a stylus on the touchpanel 162. In this case, contact of the side of the hand on the touchpanel 162 is detected by the sensor 162a (b1 in FIG. 4), and a contact of the stylus on the touchpanel 162 is then detected by the sensor 162a (b2 in FIG. 4). The contact of the portion indicated by b1 is not a contact intended to make a stylus input, and that of the portion indicated by b2 is a contact intended to make a stylus input, needless to say. FIG. 5 is an exemplary view illustrating the contents of pieces of input information output by the MCU 162b in response to detections of the contacts by the sensor 162a.

In FIG. 5, c1 indicates a region on the touchpanel 162 where the contact by the side of the hand is detected. On the other hand, c2 indicates a region on the touchpanel 162 where the contact by the stylus is detected. The stylus input support utility program 110 receives input information associated with the region c1 from the OS 100 first, and then receives input information associated with the region c2 from the OS 100. In such case, the touch input determination module 111 of the stylus input support utility program 110 determines that the stylus input has been started from the region c2. The determination principle of this touch input determination module 111 will be described below with reference to FIG. 6.

Figure 6:
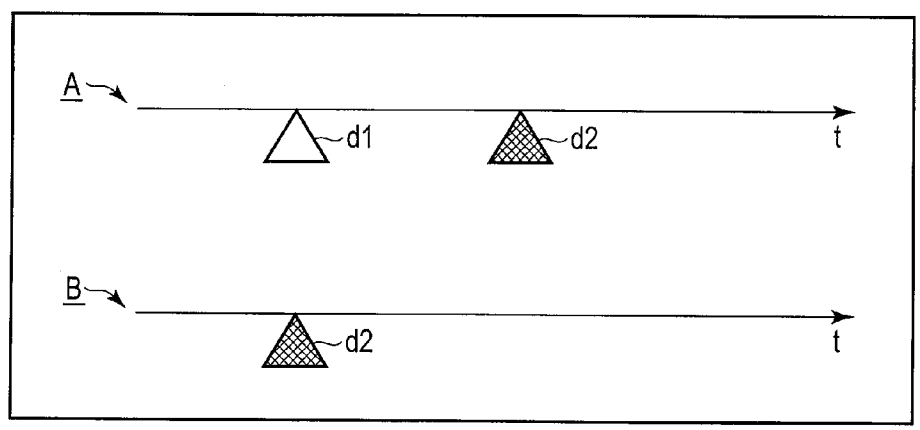
FIG. 6 is an exemplary view for explaining the touch input determination principle executed in the electronic apparatus according to the first embodiment.

In FIG. 6, a (non-hatched) triangle d1 indicates a detection timing of a contact on the touchpanel 162 for a region having an area greater than or equal to a threshold, and a (hatched) triangle d2 indicates a detection timing of a contact on the touchpanel 162 for a region having an area less than the threshold. Note that the area is included in the input information output by the MCU 162b as, for example, a pressure value (as a contact area on the touchpanel 162 is broader, this pressure value assumes a larger value).

Now assume that a contact (d1) with the touchpanel 162 for a region having an area greater than or equal to the threshold is detected first, and a contact (d2) with the touchpanel 162 for a region having an area less than the threshold is detected while this contact (d1) is kept detected, after this detection, as indicated by "A" in FIG. 6.

In this case, the touch input determination module 111 determines that the stylus input has been started from the second contact detection timing and position on the touchpanel 162. That is, this touch input is determined as a touch input for writing. When the start of the stylus input is determined, a writing stroke is displayed on the LCD 161.

Also, assume that a contact (d2) on the touchpanel 162 for a region having an area less than the threshold is solely detected, as indicated by "B" in FIG. 6. "Solely" indicates that no contact on the touchpanel 162 for a region having an area greater than or equal to the threshold is detected at the time of this detection. In this case, the touch input determination module 111 determines that this touch input is a finger input, that is, a touch input for an operation. When the finger input is determined, a display operation of a writing stroke on the LCD 161 is skipped.

That is, this electronic apparatus 1 allows the user to make a natural stylus input while placing the side of the hand on the writing surface. Also, when a contact on the touchpanel 162 for a region having an area less than the threshold is detected, the electronic apparatus 1 can automatically determine whether that contact is a stylus input for writing or a finger input for an operation. As described above, the user can make a touch input for an operation ("finger input" in this embodiment) using a stylus (without placing the side of the hand on the touchpanel 162).

Figure 7:
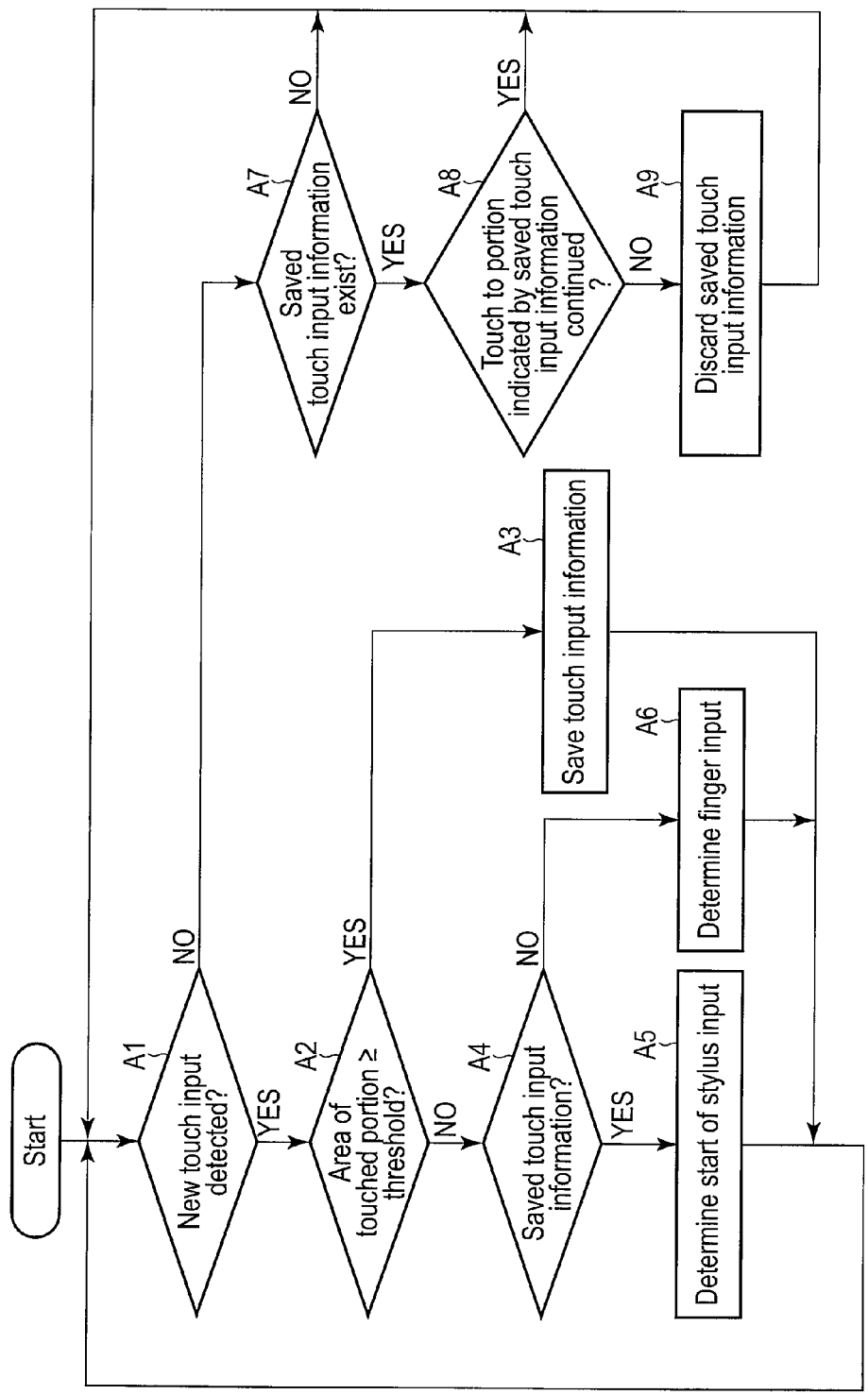
FIG. 7 is an exemplary flowchart showing the touch input determination sequence executed in the electronic apparatus according to the first embodiment.

FIG. 7 is an exemplary flowchart showing the touch input determination sequence executed by the touch input determination module 111.

When a new touch input is detected (YES in block A1), the touch input determination module 111 checks whether or not an area of that touched portion is greater than or equal to the threshold (block A2). If the area is greater than or equal to the threshold (YES in block A2), the touch input determination module 111 saves that touch input information (block A3), and the process returns to block A1 to wait for a next touch input.

On the other hand, if the area of the touched portion is less than the threshold (NO in block A2), the touch input determination module 111 checks whether or not the saved touch input information exists (block A4). If the saved touch input information exists (YES in block A4), the touch input determination module 111 determines that this touch input is a stylus input (block A5). If no saved touch input information exists (NO in block A4), the touch input determination module 111 determines that this touch input is a finger input (block A6).

In a waiting state of a new touch input (NO in block A1), if the saved touch input information exists (YES in block A7), the touch input determination module 111 checks whether or not a touch to a portion indicated by this touch input information is continued (block A8). If the touch is not continued (NO in block A8), the touch input determination module 111 discards the saved touch input information (block A9).

The operation principle of the writing stroke display position adjustment module 112 will be described below.

As described above, when a stylus input is made on the touchpanel 162, a writing stroke is displayed on the LCD 161. At this time, for example, when a protection glass cover or the like is arranged on a panel surface of the touchpanel display 16, as shown in FIG. 8, a touch position (e1) of a stylus tip and a display position (e2) of a writing stroke are apparently deviated (e3). More specifically, the user recognizes that a writing stroke is displayed in front of a writing position. The writing stroke display position adjustment module 112 adjusts the display position of a writing stroke to reduce this apparent deviation.

Referring back to FIG. 5, as described above, after the contact on the touchpanel 162 for the region (c1) having the area greater than or equal to the threshold is detected, when the contact on the touchpanel 162 for the region (c2) having the area less than the threshold is detected (while the contact on the touchpanel 162 for the region (c1) is kept detected), the touch input determination module 111 determines that the stylus input has been started. Then, when the touch input determination module 111 determines that the stylus input has been started, the writing stroke display position adjustment module 112 estimates a position of (eyes of) the user from the positional relationship between the regions (c1) and (c2). In order to allow the writing stroke display position adjustment module 112 to execute this estimation, the stylus input support utility program 110 includes a user interface which prompts the user to set right handedness or left handedness.

An electronic apparatus called a tablet terminal or the like can be normally used while its touchpanel display is set either in a landscape orientation (in a state in which the longitudinal direction agrees with the widthwise direction) or in a portrait orientation (in a state in which the longitudinal direction agrees with the lengthwise direction). Either in the landscape or portrait orientation, top and bottom positions of the touchpanel display can be arbitrarily reversed. That is, the user can be located at any side of four sides of the touchpanel display.

In such situation, the position of the user can be estimated based on information indicating the right handedness or left handedness, and the positional relationship between the regions (c1) and (c2). The writing stroke display position adjustment module 112 adjusts the display position of a writing stroke based on this estimation result. More specifically, the writing stroke display position adjustment module 112 moves the display position of the writing stroke in a direction of a side opposite to a side where the user is estimated to be located.

FIG. 9 is an exemplary flowchart showing the writing stroke display position adjustment sequence executed by the writing stroke display position adjustment module 112.

When it is determined that the stylus input has been started, the writing stroke display position adjustment module 112 determines the position of the user from the touched portion having the area greater than or equal to the threshold and that having the area less than the threshold (block B1). Then, the writing stroke display position adjustment module 112 sets parameters required to adjust the display position of a writing stroke based on the determined position of the user (block B2).

In this manner, this electronic apparatus 1 can reduce an apparent deviation between the touch position of a stylus tip and the display position of a writing stroke.

In the example of the above description, the writing stroke display position adjustment module 112 estimates the position of the user based on the positional relationship between the regions (c1) and (c2) shown in FIG. 5, and adjusts the display position of a writing stroke so as to reduce the apparent deviation (e3) shown in FIG. 8. Conversely, the apparent deviation (e3) shown in FIG. 8 can be used to estimate the position of the user.

For example, on an initial screen displayed at an activation timing of this electronic apparatus 1, an object for tracing which prompts the user to write is displayed. When a stylus input is made, the position of the user is detected from the positional relationship between the display position of this object and the touch position of the stylus tip. Based on this detection result, various operations can be executed. For example, the aforementioned writing stroke display position adjustment is executed, a screen display direction is decided, and so forth.

Second Embodiment

The second embodiment will be described below.

Figure 10:
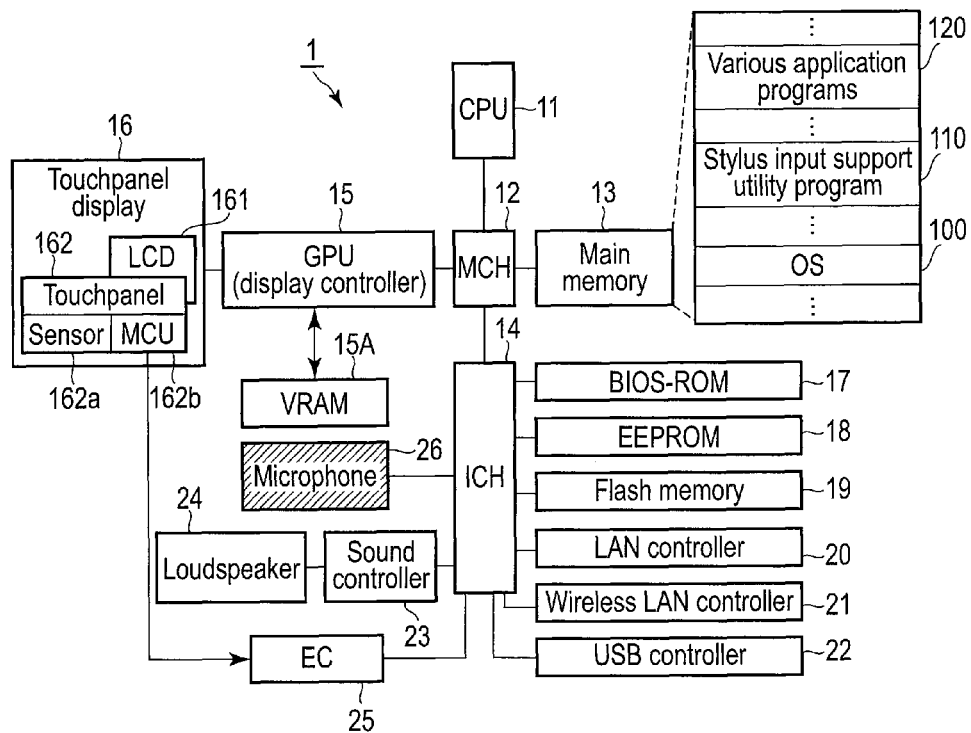
FIG. 10 is an exemplary block diagram showing the hardware arrangement of an electronic apparatus according to the second embodiment.

FIG. 10 is an exemplary block diagram showing the hardware arrangement of an electronic apparatus 1.

As shown in FIG. 10, this electronic apparatus 1 includes a microphone 26. A touch input determination module 111 of a stylus input support utility program 110 in this electronic apparatus 1 improves the start determination precision of a stylus input using an acoustic signal acquired by this microphone 26.

When a panel surface of a touchpanel display 16 and a stylus tip are hard, a click tone is generated when these panel surface and stylus tip are brought into contact with each other. Thus, the touch input determination module 111 checks whether or not the microphone 26 collects this characteristic (pulse like) tone, thereby improving the start determination precision of a stylus input.

For example, when (a) a contact on a touchpanel 162 for a region having an area greater than or equal to a threshold and (b) a contact on the touchpanel 162 for a region having an area less than the threshold are detected, the touch input determination module 111 checks whether or not the microphone 26 acquires an acoustic signal of a predetermined pattern at a timing (b) of the latter contact. If such acoustic signal is acquired, the touch input determination module 111 determines that a stylus input has been started at the timing (b).

Figure 11:
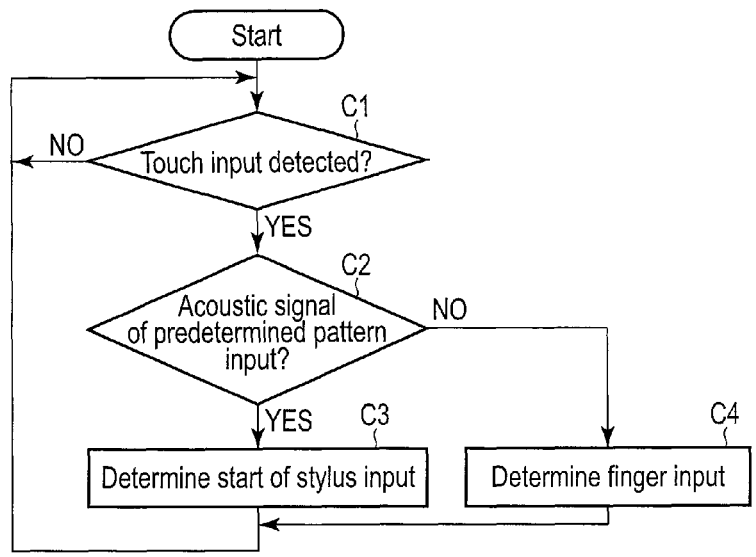
FIG. 11 is an exemplary flowchart showing the touch input determination sequence using a microphone executed in the electronic apparatus according to the second embodiment.

Note that this stylus input start determination principle using the microphone 26 is not limited to the use application for improving the determination precision (as to whether or not the stylus input has been started) at the timing (b). For example, when a contact on the touchpanel 162 is detected, this principle can also be applied to use application used to determine whether this contact is the start of a stylus input or a finger input. FIG. 11 is an exemplary flowchart showing the touch input determination sequence using the microphone 26.

If a touch input is detected (YES in block C1), the touch input determination module 111 checks whether or not an acoustic signal of a predetermined pattern is acquired by the microphone 26 (block C2). If the acoustic signal is acquired (YES in block C2), the touch input determination module 111 determines that this touch input is the start of a stylus input (block C3).

On the other hand, if the acoustic signal of the predetermined pattern is not acquired by the microphone 26 (NO in block C2), the touch input determination module 111 determines that this touch input is a finger input (block C4).

As described above, when a contact on the touchpanel 162 is detected, this electronic apparatus 1 can automatically determine using the microphone 26 whether that contact is a stylus input for writing or a finger input for an operation.

Third Embodiment

The third embodiment will be described below.

Figure 12:
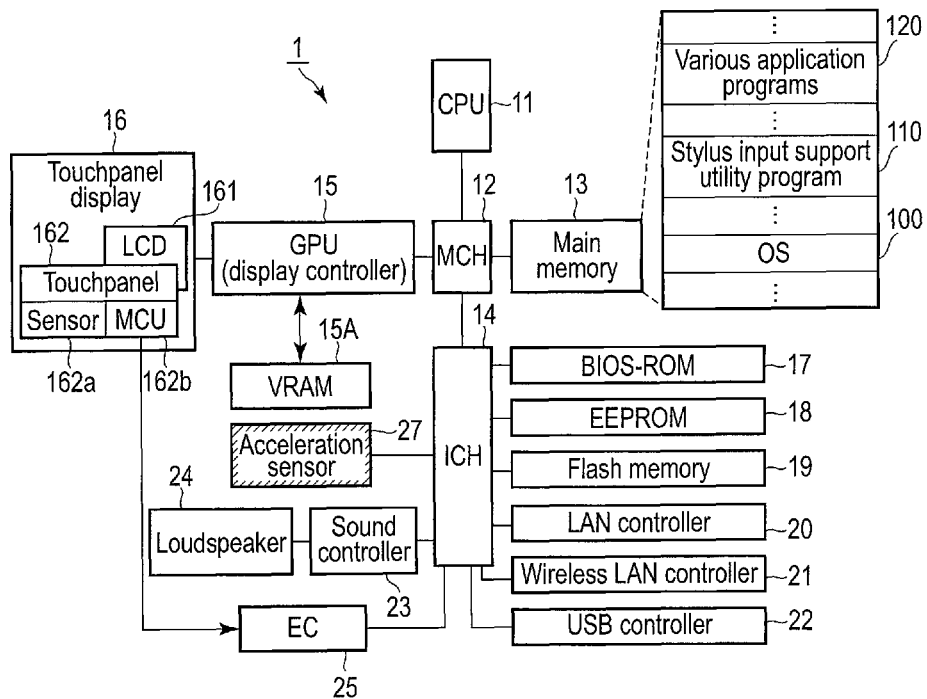
FIG. 12 is an exemplary block diagram showing the hardware arrangement of an electronic apparatus according to the third embodiment.

FIG. 12 is an exemplary block diagram showing the hardware arrangement of an electronic apparatus 1 of this embodiment.

As shown in FIG. 12, this electronic apparatus 1 includes an acceleration sensor 27. A touch input determination module 111 of a stylus input support utility program 110 in this electronic apparatus 1 improves the stylus input start determination precision using an acceleration detected by this acceleration sensor 27.

When a panel surface of a touchpanel display 16 and a stylus tip are hard, a shock is generated when these panel surface and stylus tip are brought into contact with each other. Thus, the touch input determination module 111 checks whether or not the acceleration sensor 27 detects this shock, thereby improving the start determination precision of a stylus input.

For example, when (a) a contact on a touchpanel 162 for a region having an area greater than or equal to a threshold and (b) a contact on the touchpanel 162 for a region having an area less than the threshold are detected, the touch input determination module 111 checks whether or not the acceleration sensor 27 detects an acceleration greater than or equal to a predetermined value at a timing (b) of the latter contact. If the acceleration is detected, the touch input determination module 111 determines that the stylus input has been started at the timing (b).

Figure 13:
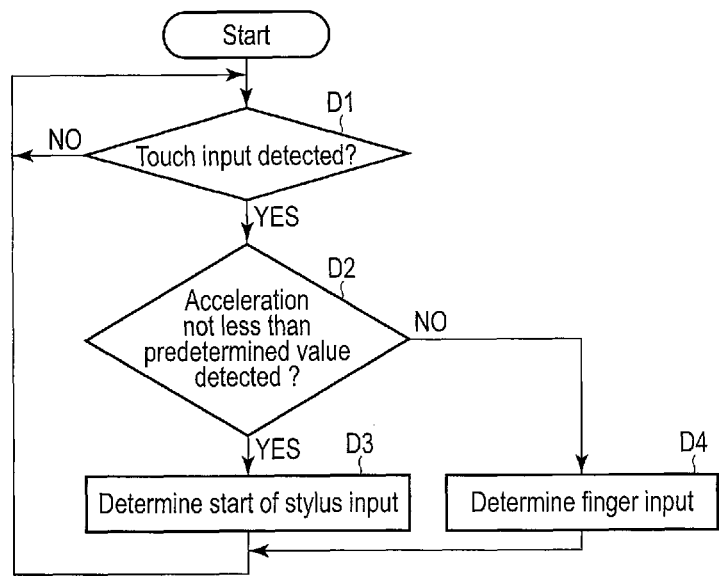
FIG. 13 is an exemplary flowchart showing the touch input determination sequence using an acceleration sensor executed in the electronic apparatus according to the third embodiment.

Note that this stylus input start determination principle using the acceleration sensor 27 is not limited to the use application for improving the determination precision (as to whether or not the stylus input has been started) at the timing (b). For example, when a contact on the touchpanel 162 is detected, this principle can also be applied to use application used to determine whether this contact is the start of a stylus input or a finger input. FIG. 13 is an exemplary flowchart showing the touch input determination sequence using the acceleration sensor 27.

If a touch input is detected (YES in block D1), the touch input determination module 111 checks whether or not an acceleration greater than or equal to a predetermined value is detected by the acceleration sensor 27 (block D2). If the acceleration is detected (YES in block D2), the touch input determination module 111 determines that this touch input is the start of a stylus input (block D3).

On the other hand, if the acceleration greater than or equal to the predetermined value is not detected by the acceleration sensor 27 (NO in block D2), the touch input determination module 111 determines that this touch input is a finger input (block D4).

As described above, when a contact on the touchpanel 162 is detected, this electronic apparatus 1 can automatically determine using the acceleration sensor 27 whether that contact is a stylus input for writing or a finger input for an operation.

Note that the operation control processing of each embodiment can be implemented by software (program). Hence, by installing and executing this software in a normal computer via a computer readable storage medium which stores this software, the same effects as those in the embodiment can be easily obtained.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a touch panel display; and
    a controller configured to:
        determine, if a first contact on the touch panel display with an area larger than a first value is detected and a second contact on the touch panel display with an area smaller than a second value is detected while the first contact is detected, that the second contact is made for a first process based on positions between the region where the first contact is detected and the region where the second contact is detected, and execute the first process; and
        determine, if the second contact is detected while the first contact is not detected, that the second contact is made for a second process different from the first process, and execute the second process,
    wherein the first process displays an object indicative of a writing stroke on the region where the second contact is detected on the touch panel display, and
    wherein the first process adjusts a display position of the object indicative of the writing stroke based on the positions between the region where the first contact is detected and the region where the second contact is detected.

2. The apparatus of claim 1, wherein:
    the second contact comprises a contact for writing when the first process is executed; and
    the second contact comprises a contact for an operation when the second process is executed.

3. The apparatus of claim 1, further comprising a microphone, wherein the controller is configured to set, if the microphone receives an acoustic signal of a first pattern when the second contact is detected, the second contact as a start of the first process.

4. The apparatus of claim 1, further comprising an acceleration sensor, wherein the controller is configured to set, if an acceleration of the electronic apparatus more than a first value is detected by the acceleration sensor when the second contact is detected, the second contact as a start of the first process.

5. The apparatus of claim 1, further comprising an estimator configured to display an object for tracing on the touch panel display, and to estimate a position of a touch operator based on a display position of the object for tracing on the touch panel display and a contact position of a touch operation on the touch panel display so as to trace the object.

6. A touch input control method for an electronic apparatus, the method comprising:
    determining, if a first contact on a touch panel display with an area larger than a first value is detected and a second contact on the touch panel display with an area smaller than a second value is detected while the first contact is detected, that the second contact is made for a first process based on positions between the region where the first contact is detected and the region where the second contact is detected, and executing the first process; and
    determining, if the second contact is detected while the first contact is not detected, that the second contact is made for a second process different from the first process, and executing the second process,
    wherein the first process displays an object indicative of a writing stroke on the region where the second contact is detected on the touch panel display, and
    wherein the first process adjusts a display position of the object based on the positions between the region where the first contact is detected and the re ion where the second contact is detected.

7. A computer-readable, non-transitory storage medium having stored thereon a computer program which is executable by a computer, the computer program controlling the computer to function as:
    a controller configured to:
        determine, if a first contact on touch panel display with an area larger than a first value is detected and a second contact on the touch panel display with an area smaller than a second value is detected while the first contact is detected, that the second contact is made for a first process based on positions between the region where the first contact is detected and the region where the second contact is detected, and execute the first process; and
        determine, if the second contact is detected while the first contact is not detected, that the second contact is made for a second process different from the first process, and execute the second process,
    wherein the first process displays an object indicative of a writing stroke on the region where the second contact is detected on the touch panel display, and
    wherein the first process adjusts a display position of the object based on the positions between the region where the first contact is detected and the re ion where the second contact is detected.

8. The method of claim 6, wherein:
    the second contact comprises a contact for writing when the first process is executed; and
    the second contact comprises a contact for an operation when the second process is executed.

9. The method of claim 6, further comprising setting, if an acoustic signal of a first pattern is received by a microphone when the second contact is detected, the second contact as a start of the first process.

10. The method of claim 6, further comprising setting, if an acceleration of the electronic apparatus more than a first value is detected by an acceleration sensor when the second contact is detected, the second contact as a start of the first process.

11. The method of claim 6, further comprising displaying an object for tracing on the touch panel display, and estimating a position of a touch operator based on a display position of the object for tracing on the touch panel display and a contact position of a touch operation on the touch panel display so as to trace the object.

12. The medium of claim 7, wherein:
the second contact comprises a contact for writing when the first process is executed; and
the second contact comprises a contact for an operation when the second process is executed.

13. The medium of claim 7, wherein the controller is configured to set, if an acoustic signal of a first pattern is received by a microphone when the second contact is detected, the second contact as a start of the first process.

14. The medium of claim 7, wherein the controller is configured to set, if an acceleration of the electronic apparatus more than a first value is detected by an acceleration sensor when the second contact is detected, the second contact as a start of the first process.

15. The medium of claim 7, wherein the computer program further controls the computer to function as an estimator configured to display an object for tracing on the touch panel display, and to estimate a position of a touch operator based on a display position of the object for tracing on the touch panel display and a contact position of a touch operation on the touch panel display so as to trace the object.

\* \* \* \* \*